United States Patent
Takahashi

(10) Patent No.: US 12,459,222 B2
(45) Date of Patent: Nov. 4, 2025

(54) TIRE VULCANIZATION DEVICE AND METHOD

(71) Applicant: The Yokohama Rubber Co., LTD., Tokyo (JP)

(72) Inventor: Yukihisa Takahashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1113 days.

(21) Appl. No.: 17/310,711

(22) PCT Filed: Dec. 2, 2019

(86) PCT No.: PCT/JP2019/047016
§ 371 (c)(1),
(2) Date: Aug. 19, 2021

(87) PCT Pub. No.: WO2020/174795
PCT Pub. Date: Sep. 3, 2020

(65) Prior Publication Data
US 2022/0143942 A1 May 12, 2022

(30) Foreign Application Priority Data

Feb. 25, 2019 (JP) .................................. 2019-031748

(51) Int. Cl.
*B29D 30/06* (2006.01)

(52) U.S. Cl.
CPC .. *B29D 30/0606* (2013.01); *B29D 2030/0617* (2013.01)

(58) Field of Classification Search
CPC ............ B29D 30/0606; B29D 30/0629; B29D 30/0662; B29D 2030/0607;
(Continued)

(56) References Cited

FOREIGN PATENT DOCUMENTS

| JP | 48-026872 | 4/1973 |
|----|-----------|--------|
| JP | 2003-220612 A | 8/2003 |

(Continued)

OTHER PUBLICATIONS

Wakahara Hitoshi, JP-2003220612-A, updated machine translation. (Year: 2003).*

(Continued)

*Primary Examiner* — Sedef E Paquette
(74) *Attorney, Agent, or Firm* — Thorpe North & Western

(57) ABSTRACT

In a tire vulcanization device and method, when a mold is closed, dividing walls disposed on an outer circumferential side of a container ring form a space with a container and hermetically block communication between the inside and outside of the container, and a center vent path communicating vertically through a center mechanism, a plurality of mold interior vent paths formed in the mold at intervals in the circumferential direction in a plan view, a container interior vent path formed in the container components and communicating between an opposing surface and a space, and the space are made to be in communication, and by an air suction machine disposed outside the container and connected to a lower end portion of the center vent path, unnecessary air present inside the mold is suctioned through the mold interior vent path and the container vent path that are in communication.

8 Claims, 6 Drawing Sheets

(58) Field of Classification Search
CPC ...... B29D 2030/0617; B29D 2030/063; B29D 2030/0658; B29D 2030/0666; B29D 2030/0667; B29D 2030/067
USPC .......................................... 425/28.1, 32, 44
See application file for complete search history.

(56) References Cited

FOREIGN PATENT DOCUMENTS

| | | | |
|---|---|---|---|
| JP | 2006-341415 A | | 12/2006 |
| JP | 2008149597 A | * | 7/2008 |
| JP | 2010201885 A | * | 9/2010 |
| JP | 2017128062 A | * | 7/2017 |
| JP | 2018-075728 A | | 5/2018 |

OTHER PUBLICATIONS

Fujishiro S, JP-2008149597-A, machine translation. (Year: 2008).*
Kimura T, JP-2010201885-A, machine translation. (Year: 2010).*
Nishimaki Hiroomi, JP-2017128062-A, machine translation. (Year: 2017).*

* cited by examiner

TIRE VULCANIZATION DEVICE AND METHOD

TECHNICAL FIELD

The present technology relates to a tire vulcanization device and method and particularly relates to a tire vulcanization device and method that can, while having a simple configuration, efficiently remove unnecessary air present inside a vulcanization mold in a vulcanization step while suppressing variation due to tire portions.

BACKGROUND ART

In a tire vulcanization step, a vulcanization bladder is expanded in a closed vulcanization mold and a green tire is then heated at a predetermined temperature and pressed at a predetermined pressure. Accordingly, the unvulcanized rubber forming the green tire is shaped on a tire molding surface of the vulcanization mold. If unnecessary air remains between the closed vulcanization mold and the green tire, the unvulcanized rubber may not be sufficiently pressurized and heated, which may cause vulcanization defects.

As such, in order to remove unnecessary air present between the closed vulcanization mold and the green tire, it has been proposed to form air-discharging paths that communicate the inside and outside of a vulcanization container with respect to a top plate, a bottom plate, and a segment forming the vulcanization container (see Japan Unexamined Patent Publication No. 2018-075728). The unnecessary air described above can be discharged to the outside of the vulcanization container through the respective air-discharging paths. However, air-discharging states vary depending on the opening positions (tire portions) of the air-discharging paths on the tire molding surface. Therefore, there is room for improvement in efficiently removing air while suppressing variation in the air discharging states.

SUMMARY

The present technology provides a tire vulcanization device and method that can, while having a simple configuration, efficiently remove unnecessary air present inside the vulcanization mold in the vulcanization step while suppressing variation due to tire portions.

A tire vulcanization device of an embodiment of the present technology having a center mechanism inserted vertically through a cylindrical vulcanization bladder, a vulcanization mold installed to surround the center mechanism, and a vulcanization container to which the vulcanization mold is attached includes dividing walls that are disposed on an outer circumferential side of a container ring forming the vulcanization container, form a space with the vulcanization container, and hermetically block communication between inside and outside of the vulcanization container in a closed state of the vulcanization mold, a center vent path communicating vertically through the center mechanism, an air suction machine disposed outside the vulcanization container and connected to a lower end portion of the center vent path, a mold interior vent path extending in the vulcanization mold to communicate between a tire molding surface and an attachment surface that is respective to a container component forming the vulcanization container, and a container interior vent path extending in the container component to communicate between an opposing surface opposing the attachment surface and the space, a plurality of the mold interior vent paths being formed at intervals in a circumferential direction in a plan view and, when the vulcanization mold is closed, the center vent path, each of the mold interior vent paths, the container interior vent path, and the space being in communication.

A tire vulcanization method of an embodiment of the present technology includes attaching a vulcanization mold to a vulcanization container, disposing a green tire transversely inside the vulcanization mold and installing the vulcanization mold to surround a center mechanism inserted vertically through a cylindrical vulcanization bladder with the vulcanization mold open, and vulcanizing a green tire with the vulcanization mold closed, the method further includes providing dividing walls that are disposed on an outer circumferential side of a container ring forming the vulcanization container, form a space with the vulcanization container, and hermetically block communication between inside and outside of the vulcanization container in a closed state of the vulcanization mold, providing, in the center mechanism, a center vent path communicating vertically through the center mechanism, providing, in the vulcanization mold, a plurality of mold interior vent paths extending at intervals in the circumferential direction in a plan view to communicate between a tire molding surface and an attachment surface that is respective to a container component forming the vulcanization container, and providing, in the container component, a container interior vent path extending in the container components to communicate between an opposing surface opposing the attachment surface and the space, when the vulcanization mold is closed, the center vent path, each of the mold interior vent paths, the container interior vent path, and the space being allowed to be in communication, and by an air suction machine disposed outside the vulcanization container and connected to a lower end portion of the center vent path, air that is present inside the vulcanization mold being suctioned through the mold interior vent path and the container interior vent path that are in communication.

According to embodiments of the present technology, by closing the vulcanization mold, the center vent path, each of the mold interior vent paths, the container interior vent path, and the space can be made to be in communication. By operating the air suction machine disposed outside the vulcanization container connected to the lower end of the center vent path in this state, air present inside the vulcanization mold can be discharged to the outside of the container through the mold interior vent path and the container interior vent path that are in communication. In other words, with a simple configuration not using a complex mechanism, unnecessary air present inside the vulcanization mold can be actively suctioned toward the center portion of the vulcanization mold in a plan view, using a plurality of the mold interior vent paths formed in the vulcanization mold at intervals in the circumferential direction in a plan view. Therefore, this air can be efficiently removed while suppressing variation due to the tire portions.

DETAILED DESCRIPTION

Figure 1:
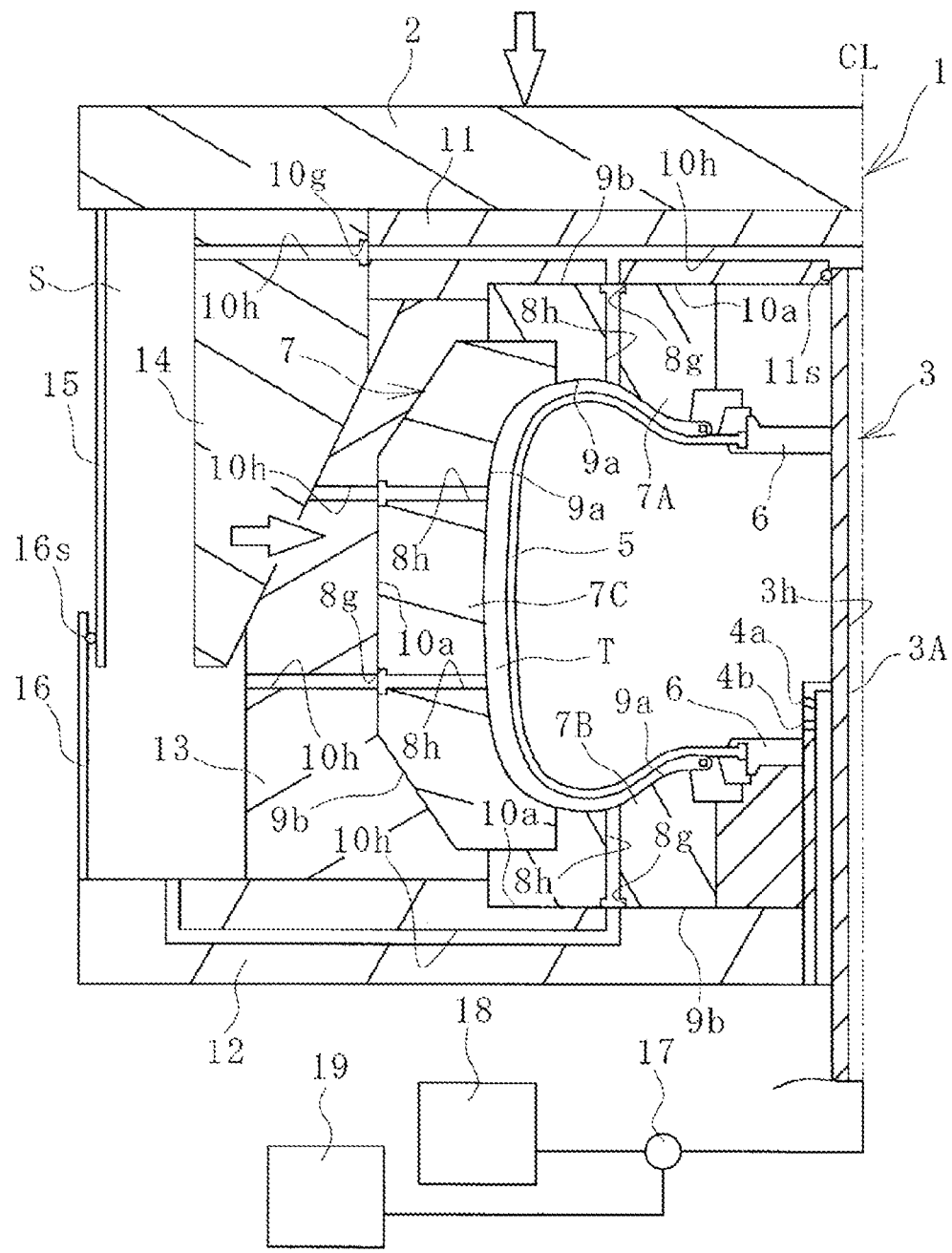
FIG. 1 is an explanatory diagram illustrating the left half of a tire vulcanization device of an embodiment of the present technology with a vulcanization mold in a closed state in a vertical cross-sectional view.

Hereinafter, a tire vulcanization device and method of the present technology will be described based on the embodiment illustrated in the figure.

The tire vulcanization device 1 of an embodiment of the present technology illustrated in FIGS. 1 and 2 (hereinafter referred to as a vulcanization device 1) includes a center mechanism 3, a vertical movement plate portion 2 that moves vertically above the center mechanism 3, a vulcanization mold 7 (hereinafter referred to as a mold 7), and a vulcanization container 10 (hereinafter, referred to as a container 10). Furthermore, the vulcanization device 1 includes dividing walls 15, 16 that hermetically block communication between the inside and outside of the container 10, and an air suction machine 18 disposed outside the container 10. A vacuum pump may be used as the air suction machine 18.

In this embodiment, the vulcanization device 1 further includes an air injection machine 19 disposed outside of the container 10. An air compressor may be used as the air injection machine 19. The air suction machine 18 and the air injection machine 19 are connected, via a switching valve 17, to the lower end portion of the center vent path 3h vertically extending through the center post 3A forming the center mechanism 3. By operating the switching valve 17, either one of the air suction machine 18 and the air injection machine 19 selectively communicates with the center vent path 3h. Only the air suction machine 18 may be disposed outside of the container 10 and only the air suction machine 18 may be connected to the lower end of the center vent path 3h, or only the air injection machine 19 may be disposed outside the container 10 and only the air injection machine 19 may be connected to the lower end of the center vent path 3h.

The vertical movement plate portion 2 moves vertically by a hydraulic cylinder, for example. Disc-shaped clamp portions 6 are attached to the center post 3A at intervals in the vertical direction. The upper and lower end portions of a cylindrical vulcanization bladder 5 are gripped by the respective clamp portions 6. The center mechanism 3 is inserted vertically through the vulcanization bladder 5.

An injection port 4a and a discharge port 4b are provided on an outer circumferential surface of the center mechanism 3 at positions between the top side clamp portion 6 and the bottom side clamp portion 6. The injection port 4a and the discharge port 4b are each connected to piping extending downward from the center mechanism 3. A heating medium or a pressurized medium is injected into the vulcanization bladder 5 from the injection port 4a. From the discharge port 4b, fluid (heating medium and pressurizing medium) inside the vulcanization bladder 5 is discharged to the outside.

When vulcanizing the green tire T, the container 10 is installed to surround the center mechanism 3. A mold 7 is attached to the container 10. The container 10 includes a top plate 11, a bottom plate 12, a plurality of segments 13, and a container ring 14 forming container components. The container ring 14 is attached to the vertical movement plate portion 2 by bolts, for example.

A sectional type mold 7 is attached to the container 10. The mold 7 has an annular upper side mold 7A, an annular lower side mold 7B, and a plurality of sector molds 7C that are arcuate in a plan view.

The top surface 9b (an attachment surface 9b described below) of the upper side mold 7A is opposing and attached to the bottom surface 10a (an opposing surface 10a described below) of the top plate 11. The top plate 11 moves vertically with the upper side mold 7A independent of the vertical movement plate portion 2 (container ring 14) by a drive means not illustrated in the drawings. The bottom surface 9b (an attachment surface 9b described below) of the lower side mold 7B is opposing and attached to the top surface 10a (an opposing surface 10a described below) of the bottom plate 12. The bottom plate 12 is fixed to the ground base in an immovable state. The outer circumferential surface 9b (an attachment surface 9b described below) of the sector mold 7C is opposing and attached to the inner circumferential surface 10a (an opposing surface 10a described below) of each of the segments 13.

Each of the sector molds 7C (the segments 13) are arranged in an annular shape around the center mechanism 3. In other words, as illustrated in FIG. 2, each of the sector molds 7C (the segments 13) is arranged in an annular shape in a plan view, and the annular center of the sector molds 7C is indicated by a dot-dash line CL. The center mechanism 3 (the center post 3A) is disposed at the annular center CL. The annular center CL is the annular center of the upper side mold 7A and the lower side mold 7B. While the left half of the vulcanization device 1 is illustrated in FIG. 1, the right half has a substantially identical structure to that of the left half.

The outer circumferential surface of each of the segments 13 has an inclined surface inclined downward from above toward the outer circumference side. Guide grooves extend in the vertical direction along the outer circumferential inclined surface of each of the segments 13.

The cylindrical container ring 14 is disposed about the center mechanism 3 (the cylindrical center CL) and moves vertically on the outer circumference side of each of the segments 13. The inner circumferential surface of the container ring 14 has an inclined surface inclined downward from above toward the outer circumference side. The inner circumferential inclined surface of the container ring 14 and the outer circumferential inclined surface of each of the segments 13 are disposed opposing each other.

A plurality of guide keys are arranged at intervals in the circumferential direction on the inner circumferential surface of the container ring 14. The guide keys extend in the vertical direction along the inner circumferential inclined surface of the container ring 14. Each guide key engages a guide groove of the corresponding segment 13, and the guide key (inner circumferential inclined surface of the container ring 14) and the guide groove (outer circumferential inclined surface of the segment 13) slide. In this embodiment, each segment 13 is suspended from the container ring 14 by a guide key engaged with a guide groove.

A cylindrical upper dividing wall 15 extending downward is attached in the vicinity of the outer circumferential surface of the vertical movement plate portion 2. A cylindrical lower dividing wall 16 extending upward is attached in the vicinity of the outer circumferential surface of the bottom plate 12. Since the lower end portion of the upper dividing wall 15 and the upper end portion of the lower dividing wall 16 are overwrapped vertically, and the annular sealant 16s is interposed therebetween, the inside and outside of the container 10 are hermetically blocked. The sealant 16s, such as an O-ring, may be fixed to the inner circumferential surface of the lower dividing wall 16, or may be fixed to the outer circumferential surface of the upper dividing wall 15. The dividing walls 15, 16 disposed on the outer circumferential side of the container ring 14 form a space S with the container 10 in a closed state of the mold 7.

A mold interior vent path 8h (hereinafter referred to as a vent path 8h) extends in the mold 7 and communicates between the tire molding surface 9a and the attachment surface 9b respective to the container components 11, 12, and 13. A plurality of the vent paths 8h are formed at intervals in the circumferential direction in a plan view. The vent path 8h is formed opening to the tire molding surface 9a where air-discharge is required in the vulcanization step.

To describe the vent path 8h in detail, a vent path 8h extending through the upper side mold 7A and the lower side mold 7B in the vertical direction (thickness direction) are formed in the upper side mold 7A and the lower side mold 7B. A vent path 8h extending through each of the sector molds 7C in the radial direction (thickness direction) in plan view is formed in each of the sector molds 7C. In the drawings, the vent path 8h is described as being greatly exaggerated, however, the so-called vent hole is the vent path 8h.

A container interior vent path 10h (hereinafter referred to as a vent path 10h) communicating between the opposing surface 10a opposing the attachment surface 9b and the space S extends in the container components 11, 12, and 13. To describe the vent path 10h in detail, a vent path 10h extending through from the opposing surface 10a to the outer circumferential surface is formed in the top plate 11. An annular sealant 11s is fixed to the inner circumferential surface of the vent path 10h formed at a position of the top plate 11 corresponding to that above the center mechanism 3. A vent path 10h extending through from the opposing surface 10a to the top surface in the vicinity of the outer circumferential surface (the surface exposed to the space S) is formed in the bottom plate 12. A vent path 10h extending through from the opposing surface 10a to the outer circumferential surface (the surface exposed to the space S) is formed in each of the segments 13. A vent path 10h extending through from the inner circumferential surface (the surface that contacts the outer circumferential surface of the top plate 11) to the outer circumferential surface (the surface exposed to the space S) is formed in the container ring 14.

When the mold 7 is closed, the center vent path 3h, each of the vent paths 8h, each of the vent paths 10h, and the space S are in communication. In this embodiment, when the mold 7 is closed, the mold interior vent paths 8h, 10h extend radially about the center vent path 3h in a plan view and are in communication.

An annular circumferential groove 8g extending in the circumferential direction is formed in the attachment surface 9b. The circumferential groove 8g communicates between each of the vent paths 8h opening to the attachment surface 9b. Alternatively or in addition to the circumferential groove 8g, an annular circumferential groove extending in the circumferential direction can be made in the opposing surface 10a to communicate between each of the vent paths 8h opening to the attachment surface 9b.

Next, a procedure of vulcanizing the green tire T using the vulcanizing device 1 will be described.

When vulcanizing the green tire T, the container 10 to which the mold 7 is attached is installed to surround the center mechanism 3. Then, the green tire T is disposed sideways on the lower side mold 7B inside the mold 7 which is wide open.

Figure 3:
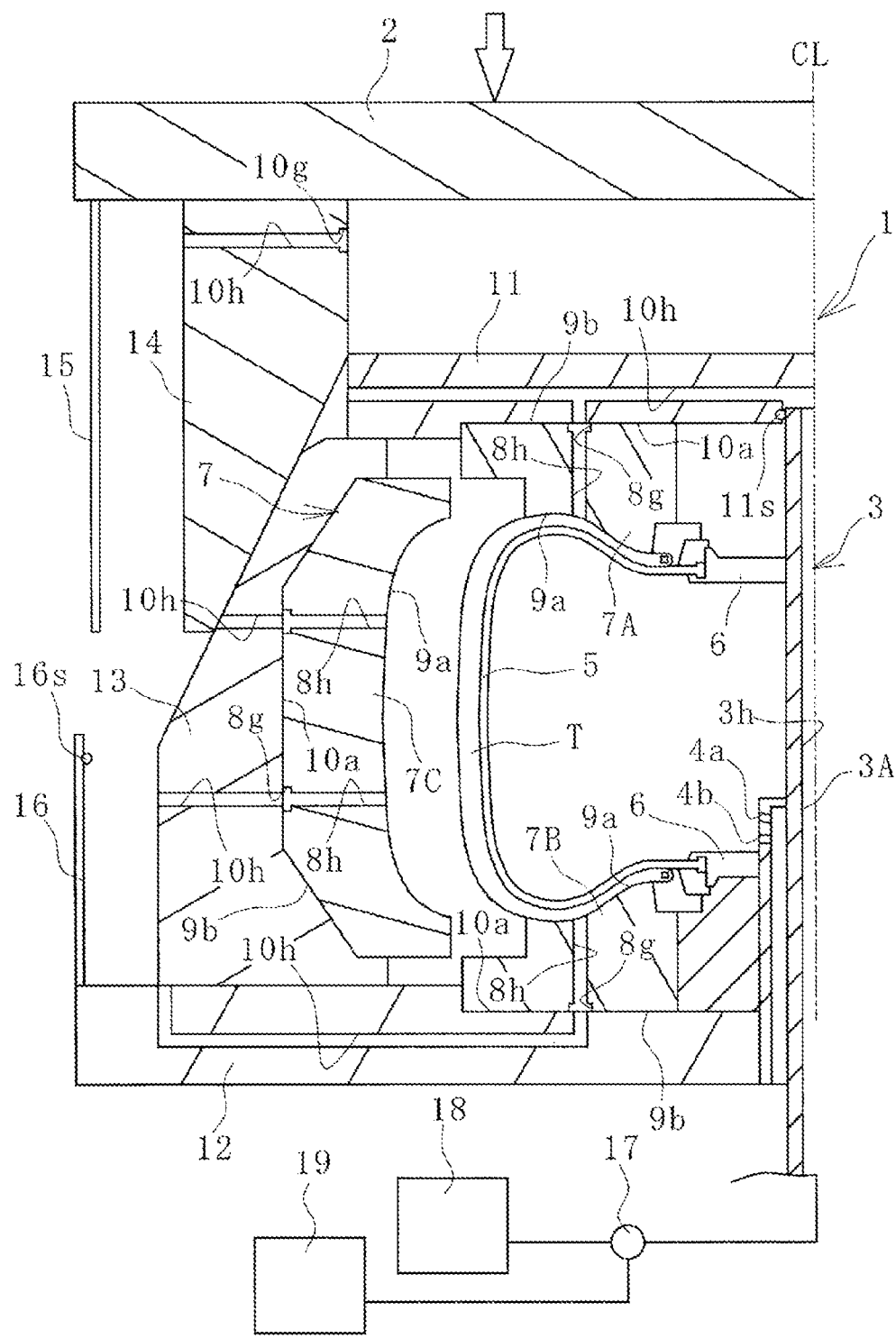
FIG. 3 is an explanatory diagram illustrating a tire vulcanization device with the vulcanization mold of FIG. 1 in an open state.
Figure 4:
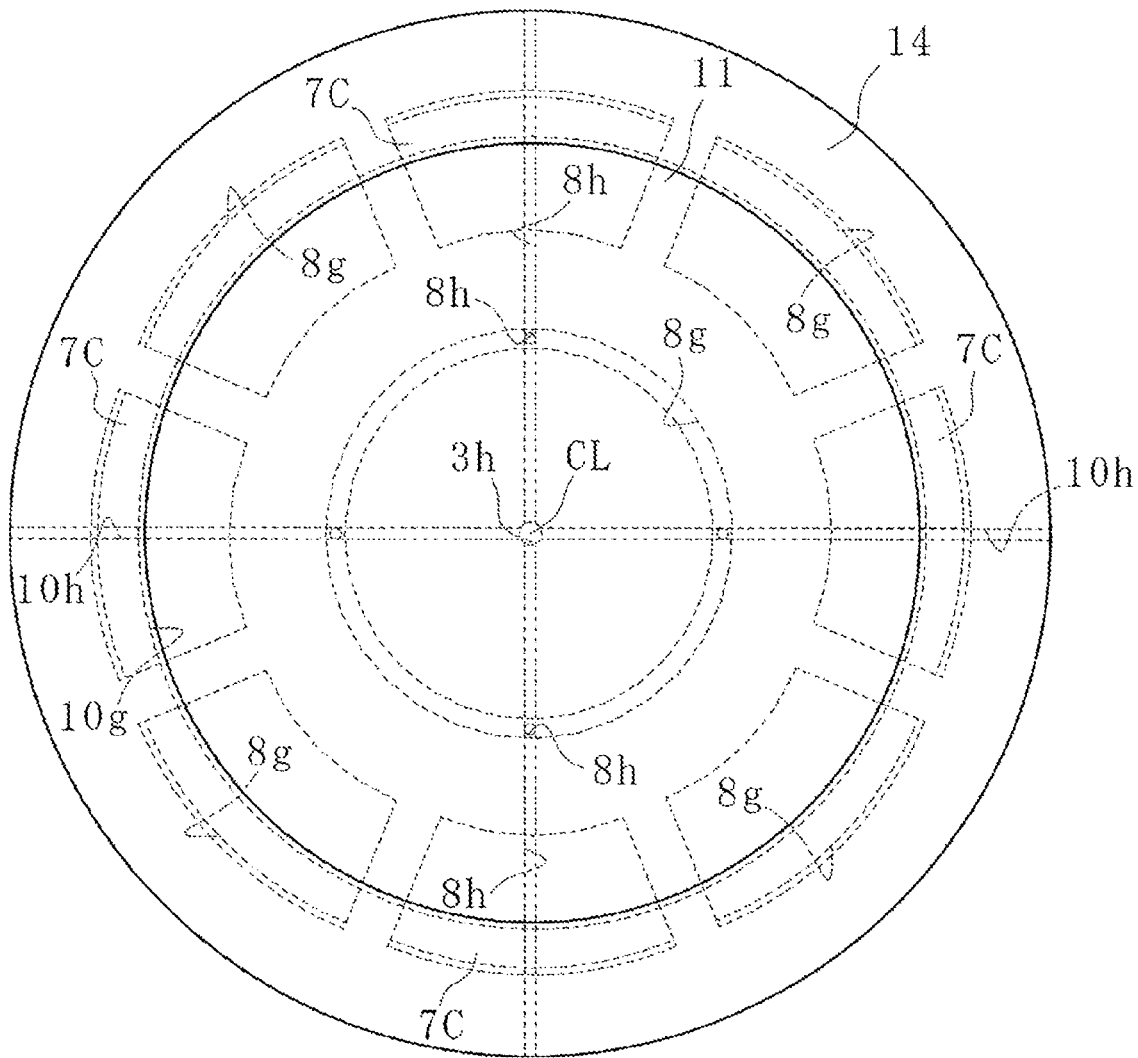
FIG. 4 is an explanatory diagram illustrating a container ring, a top plate, and a sector mold of FIG. 3 in a plan view.

Next, as illustrated in FIG. 3, the upper side mold 7A is moved downward along with the top plate 11 in the upper standby position, and the container ring 14 and each of the segments 13 are moved downward together with the vertical movement plate portion 2. Accordingly, each of the segments 13 is placed on the top surface of the lower plate 12 to be sandwiched between the top plate 11 and the bottom plate 12. In this state, as illustrated in FIG. 4, each of the sector molds 7C (the segments 13) is disposed in a position that is expanded in diameter in a plan view.

Next, the container ring 14 together with the vertical movement plate portion 2 is moved further downward from the state illustrated in FIG. 3. Accordingly, the outer circumferential inclined surface of each of the segments 13 is pressed by the inner circumferential inclined surface of the container ring 14 moving downward. As a result, as illustrated in FIGS. 1 and 2, each of the sector molds 7C moves close with respect to the annular center CL, and the sector molds 7C are assembled in an annular shape to close the mold 7.

Figure 2:
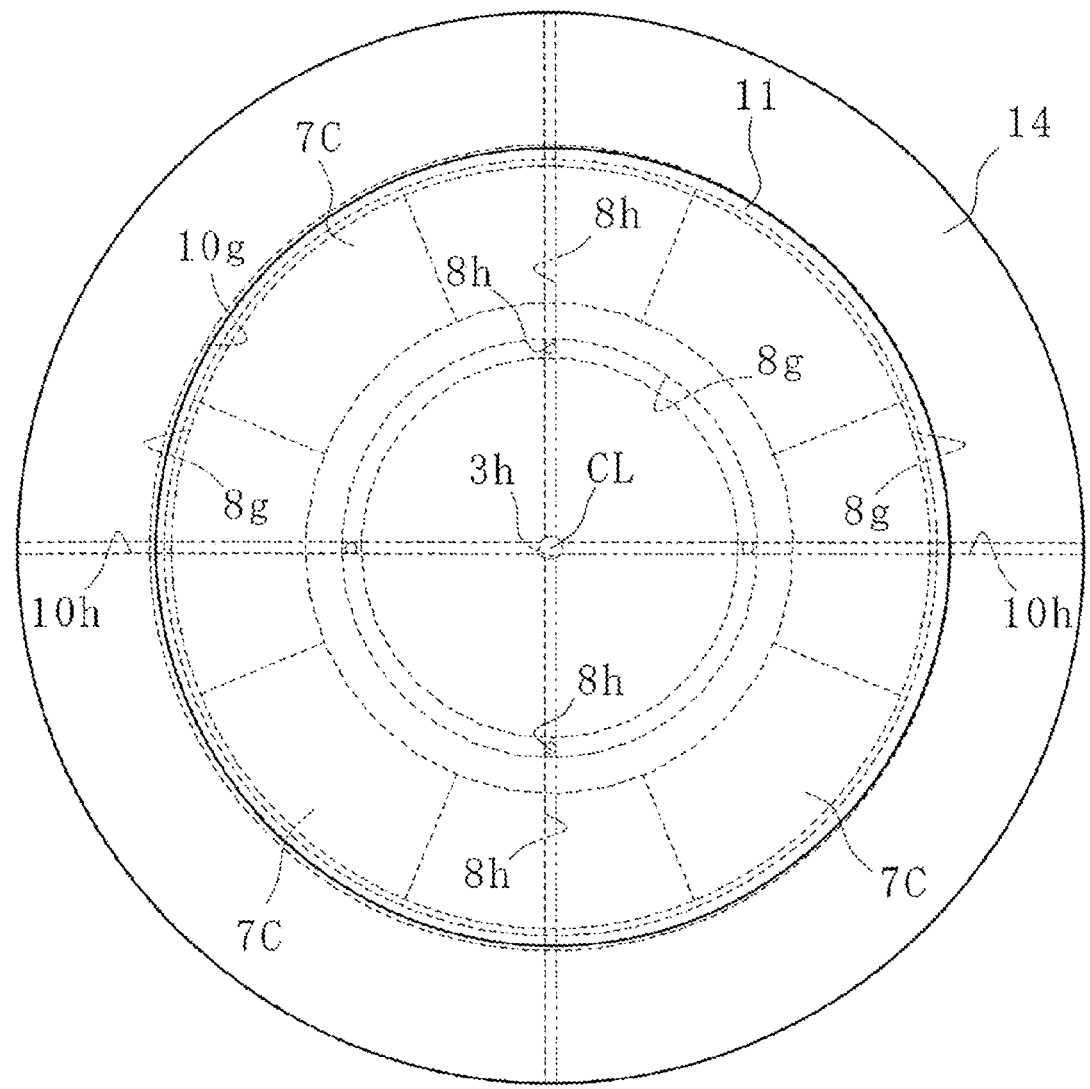
FIG. 2 is an explanatory diagram illustrating a container ring, a top plate, and a sector mold of FIG. 1 in a plan view.

When the mold 7 is closed, as illustrated in FIG. 1, the center vent path 3h, each of the vent paths 8h, 10h, and the space S are automatically in communication. The center vent path 3h and the vent path 8h are connected in a hermetic manner by a sealant 11s.

Figure 5:
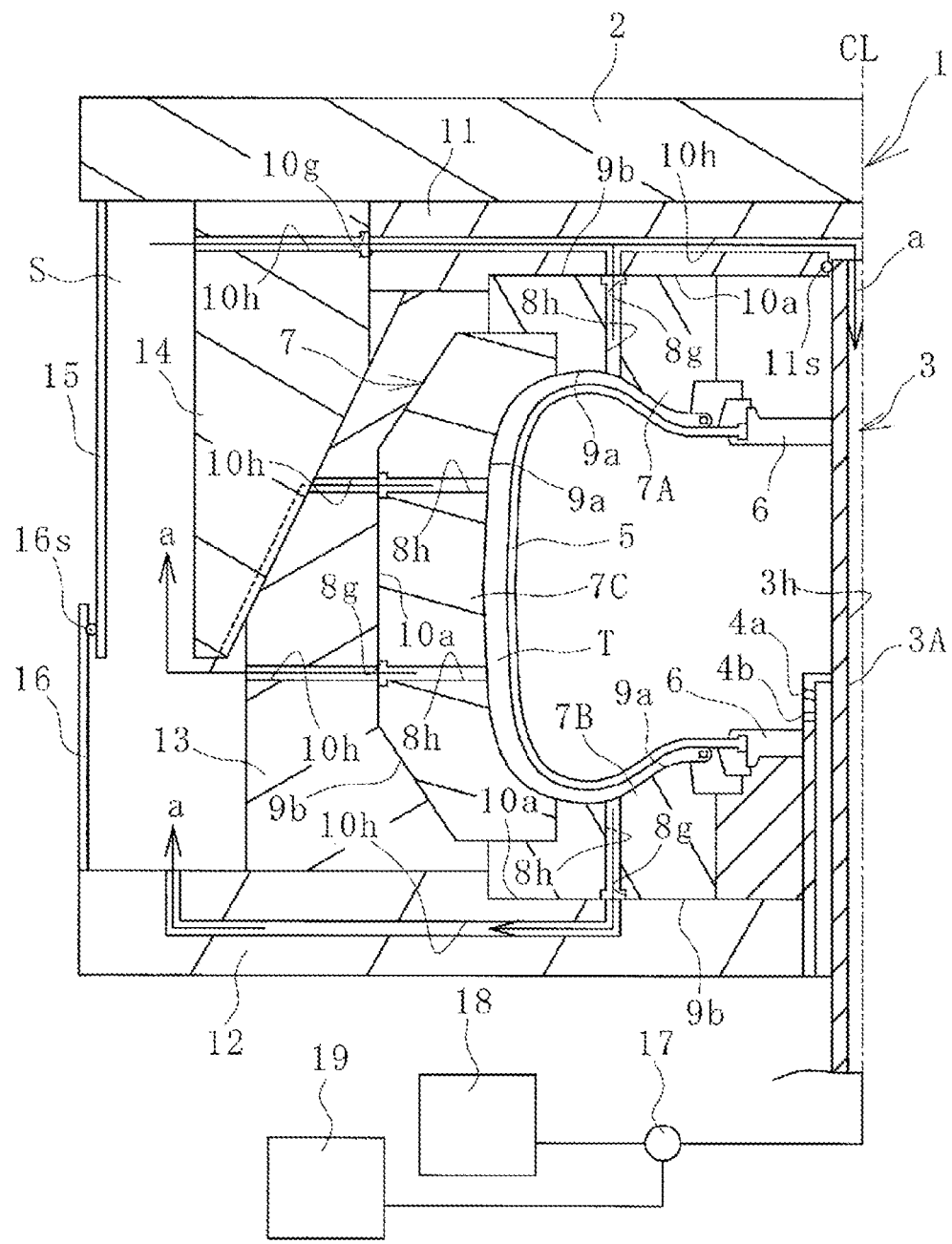
FIG. 5 is an explanatory diagram illustrating a state in which air inside the vulcanization mold of FIG. 1 is suctioned and discharged to the outside of the vulcanization container.

In this state, as illustrated in FIG. 5, the air suction machine 18 is operated and unnecessary air a present inside the mold 7 (between the tire molding surface 9a and the green tire T) is suctioned through the vent paths 8h, 10h and the center vent path 3h that are in communication to discharge the air to the outside of the container 10. Note that if there is a gap between the members, such as between the segments 13 and the container ring 14, the unwanted air a is discharged into the space S through the gap and, as a result, is removed to the outside of the container 10.

Next, inside the closed mold 12, the vulcanization bladder 5 is sufficiently expanded by injecting heating medium and pressurizing medium from the injection port 4a into the vulcanization bladder 5 to apply a predetermined pressure to the green tire T, and the green tire T is heated and vulcanized at a predetermined temperature. When the predetermined vulcanization time has elapsed, the vulcanization of the green tire T is completed, and the vulcanized tire Ta is obtained.

As described above, according to the vulcanization device 1, unnecessary air a can be reliably removed by actively suctioning the air a present between the tire molding surface 9a and the green tire T, with a simple configuration not using a complex mechanism. Even if the vent paths 8h are opening to various positions on the tire molding surface 9a, the unnecessary air a is suctioned toward one place into the center portion of the mold 7 in a plan view (center vent path 3h). As a result, unnecessary air a can be efficiently removed while suppressing variation due to the tire portions (the opening positions of the vent path 8h in the tire molding surface 9a).

As in this embodiment, with the mold 7 closed, the vent paths 8h, 10h extending radially about the center vent path 3h in a plan view and in communication are further advantageous in removing unnecessary air a while suppressing the variation due to the tire portions. Additionally, with the circumferential groove 8g described above being provided, air a can flow through the circumferential groove 8g, which is further advantageous in removing unnecessary air a while suppressing the variation due to tire portions.

By removing unnecessary air a, the green tire T can be heated while sufficiently pressing against the tire molding surface 9a. Therefore, vulcanization defects hardly occur in the vulcanized tire Ta, which is advantageous in improving tire quality.

In addition, there is also an advantage that it is not necessary to excessively expand the vulcanization bladder 5 for the purpose of removing unnecessary air a. Furthermore, there is also an advantage that a deep groove or the like for air removal is not required to be formed on the outer surface of the vulcanization bladder 5. Since the vulcanization bladder 5 is repeatedly used by expanding and contracting at high temperatures, these advantages are very advantageous in suppressing damage to the vulcanization bladder 5.

Figure 6:
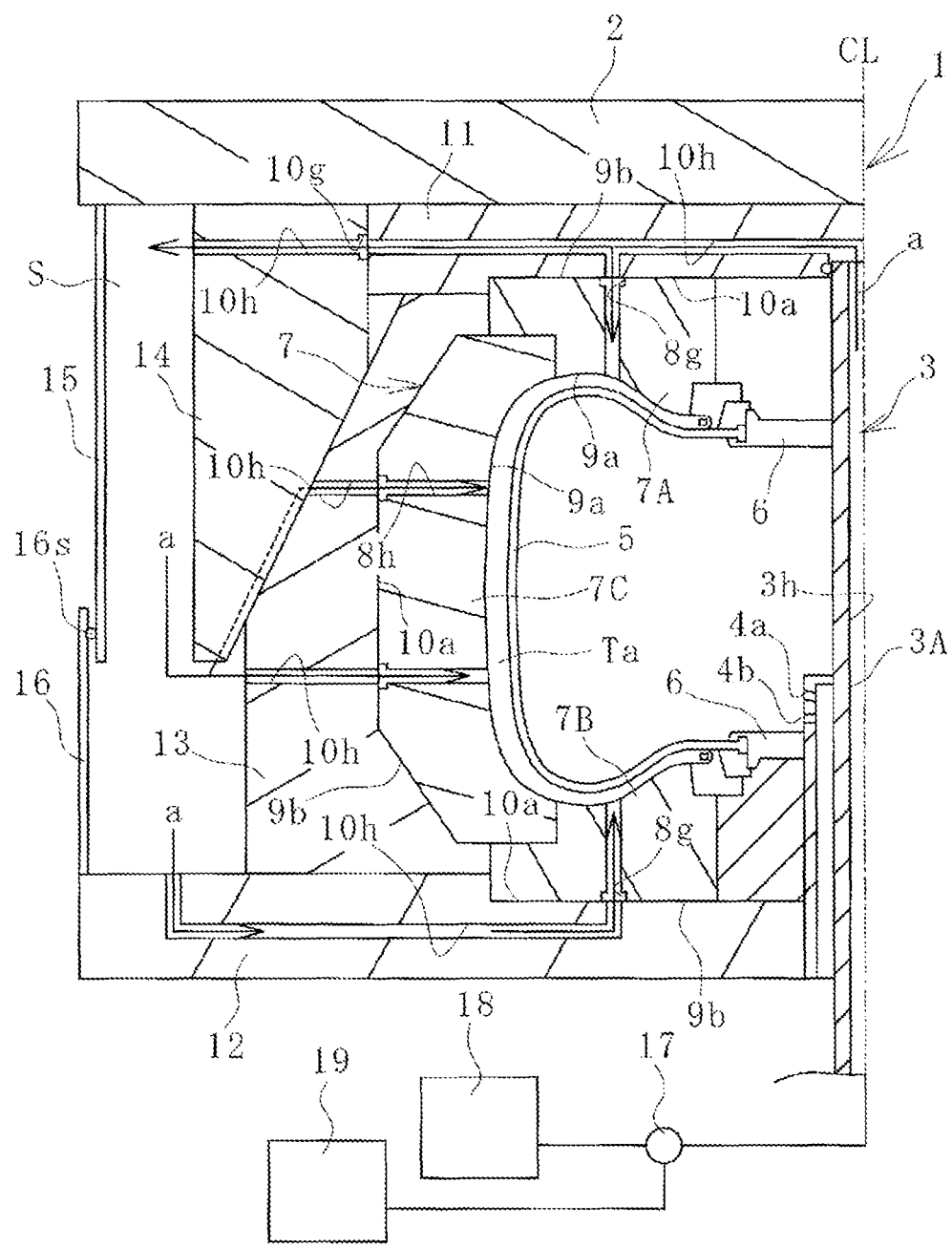
FIG. 6 is an explanatory diagram illustrating a state in which air is injected from the outside of the vulcanization container into the inside of the vulcanization mold after vulcanization of the green tire of FIG. 1.

After the green tire T is vulcanized, the mold 7 is opened and the tire Ta is removed from the vulcanization device 1. Immediately after the vulcanization is completed, the vulcanized tire T is adhered to the tire molding surface 9a. Thus, in this embodiment, the switching valve 17 is operated to communicate the air injection machine 19 to the center vent path 3h. Then, as illustrated in FIG. 6, the air injection machine 19 is operated, with the mold 7 closed, to inject the air a into the inside of the mold 7 (between the tire molding surface 9a and the tire Ta) through the vent paths 8h, 10h that are in communication. In this way, the tire Ta is easily peeled from the tire molding surface 9a.

At this time, if it is possible to contract the vulcanization bladder 5 to form a slight gap between the outer surface of the vulcanization bladder 5 and the inner surface of the tire Ta in the vicinity of the bead portion of the tire Ta, the injected air a enters between the outer surface of the vulcanization bladder 5 and the inner surface of the tire Ta, making it easier to peel the vulcanization bladder 5 from the tire Ta. After the vulcanization bladder 5 is peeled from the tire Ta and contracted, the tire Ta is removed from the vulcanization bladder 5 and removed from the vulcanization device 1.

Embodiments of the present technology are not limited to a sectional type mold 7, but can also be applied to a two-part type formed with an upper side mold and a lower side mold disposed vertically opposing each other.

The invention claimed is:

1. A tire vulcanization device having a center mechanism inserted vertically through a cylindrical vulcanization bladder, a vulcanization mold installed to surround the center mechanism, and a vulcanization container to which the vulcanization mold is attached, comprising:
   dividing walls that are disposed on an outer circumferential side of a container ring forming the vulcanization container, form a space with the vulcanization container, and hermetically block communication between inside and outside of the vulcanization container in a closed state of the vulcanization mold;
   a center vent path vertically extending through a center post forming the center mechanism;
   an air suction machine disposed outside the vulcanization container and connected to a lower end portion of the center vent path;
   a mold interior vent path extending in the vulcanization mold to communicate between a tire molding surface and an attachment surface that is respective to a container component forming the vulcanization container; and,
   a container interior vent path extending in the container component to communicate between an opposing surface opposing the attachment surface and the space,
   a plurality of the mold interior vent paths being formed at intervals in a circumferential direction in a plan view and, when the vulcanization mold is closed, the center vent path, each of the mold interior vent paths, the container interior vent path, and the space being in communication.

2. The tire vulcanization device according to claim 1, further comprising an air injection machine disposed outside of the vulcanization container and connected to the lower end portion of the center vent path,
   wherein the air injection machine injects air between the tire molding surface and a vulcanized tire in the vulcanization mold through the center vent path, each of the container interior vent paths and the mold interior vent path being in communication.

3. The tire vulcanization device according to claim 2, wherein when the vulcanization mold is closed, the mold interior vent path and the container interior vent path extend radially about the center vent path in a plan view and are in communication.

4. The tire vulcanization device according to claim 3, wherein an annular circumferential groove extending in the circumferential direction on the attachment surface and allowing the plurality of the mold interior vent paths opening to the attachment surface to be in communication, or an annular circumferential groove extending in the circumferential direction on the opposing surface and allowing the plurality of the container interior vent paths opening to the opposing surface to be in communication, is formed.

5. The tire vulcanization device according to claim 1, wherein when the vulcanization mold is closed, the mold interior vent path and the container interior vent path extend radially about the center vent path in a plan view and are in communication.

6. The tire vulcanization device according to claim 1, wherein an annular circumferential groove extending in the circumferential direction on the attachment surface and allowing the plurality of the mold interior vent paths opening to the attachment surface to be in communication, or an annular circumferential groove extending in the circumferential direction on the opposing surface and allowing the plurality of the container interior vent paths opening to the opposing surface to be in communication, is formed.

7. A tire vulcanizing method, comprising:
   attaching a vulcanization mold to a vulcanization container;
   disposing a green tire transversely inside the vulcanization mold and installing the vulcanization mold to surround a center mechanism inserted vertically through a cylindrical vulcanization bladder with the vulcanization mold open; and,
   vulcanizing a green tire with the vulcanization mold closed,
   the method further comprising:
   providing dividing walls that are disposed on an outer circumferential side of a container ring forming the vulcanization container, form a space with the vulcanization container, and hermetically block communication between inside and outside of the vulcanization container in a closed state of the vulcanization mold;

providing, in the center mechanism, a center vent path vertically extending through a center post;

providing, in the vulcanization mold, a plurality of mold interior vent paths extending at intervals in a circumferential direction in a plan view to communicate between a tire molding surface and an attachment surface that is respective to a container component forming the vulcanization container; and, providing, in the container component, a container interior vent path extending in the container components to communicate between an opposing surface opposing the attachment surface and the space, when the vulcanization mold is closed, the center vent path, each of the mold interior vent paths, the container interior vent path, and the space being allowed to be in communication, and by an air suction machine disposed outside the vulcanization container and connected to a lower end portion of the center vent path, air that is present inside the vulcanization mold being suctioned through the mold interior vent path and the container interior vent path that are in communication.

8. The tire vulcanizing method according to claim 7, wherein after the green tire is vulcanized, by an air injection machine disposed outside the vulcanization container and connected to a lower end portion of the center vent path, air is injected between the tire molding surface and a vulcanized tire in the vulcanization mold through the center vent path, the mold interior vent path and the container interior vent path that are in communication with the vulcanization mold closed.

* * * * *